No. 670,535. Patented Mar. 26, 1901.
A. A. CARSON.
FRICTIONAL DRIVING MECHANISM.
(Application filed May 7, 1900.)
(No Model.)
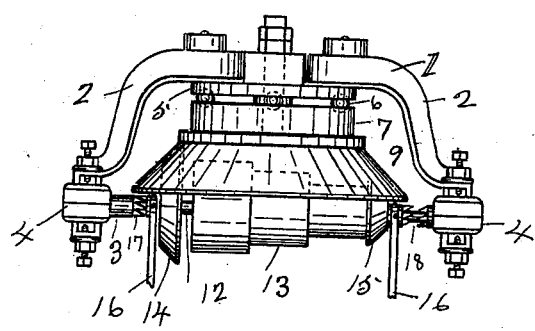
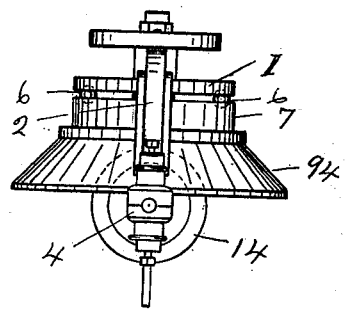
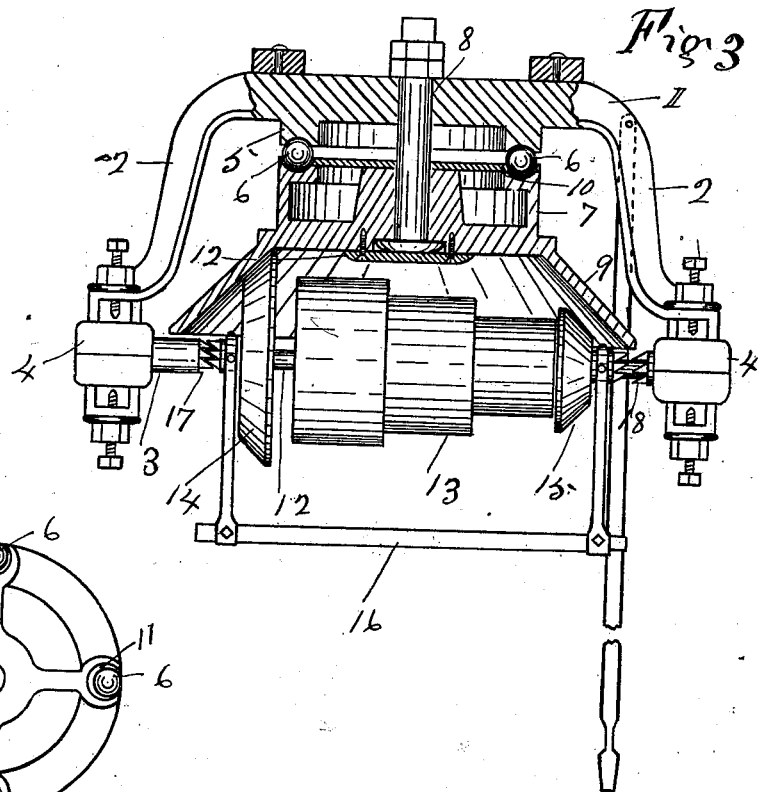
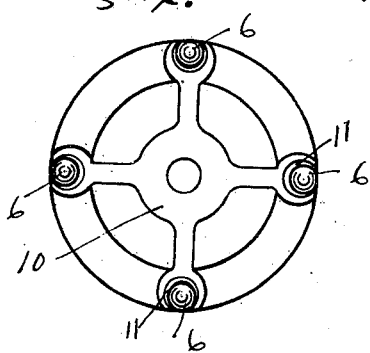
WITNESSES:
Adelaide Kearns.
Augusta Viberg.
Albert A. Carson  INVENTOR
BY Chapin & Denny
His ATTORNEYS.

UNITED STATES PATENT OFFICE.

ALBERT A. CARSON, OF BLUFFTON, INDIANA.

FRICTIONAL DRIVING MECHANISM.

SPECIFICATION forming part of Letters Patent No. 670,535, dated March 26, 1901.

Application filed May 7, 1900. Serial No. 15,686. (No model.)

*To all whom it may concern:*

Be it known that I, ALBERT A. CARSON, a citizen of the United States, residing at Bluffton, in the county of Wells, in the State of Indiana, have invented certain new and useful Improvements in Frictional Driving Mechanism; and I do hereby declare that the following is a full, clear, and exact description of the invention, which will enable others skilled in the art to which it appertains to make and use the same, reference being had to the accompanying drawings, which form a part of this specification.

My invention relates to improvements in frictional driving mechanism.

The object of my present invention is to provide an improved friction-disk so constructed and arranged that the counter-shaft can be readily placed at different angles to or in parallel relation with the line-shaft and so constructed as to permit an instantaneous reverse of the driven mechanism, as well as afford a variation of speed by varying the size of the driven pulley.

My improvement consists of a driving member or a conical actuating friction-disk and a driven member consisting of a cone-pulley having upon its opposite ends rigid friction-disks adapted for an actuating engagement alternately with the said disk and means for laterally shifting the said pulley to engage either the one or the other of the said pulley-disks with the driving member.

The principal novel features of my invention reside in the construction of the driving-disk and in its coöperation with the driven member.

Similar reference-numerals indicate like parts throughout the several views, in which—

Figure 1 is a side view of my improvement suspended from a suitable hanger, showing the relative arrangement of the operative parts. Fig. 2 is a side view of the same, taken at right angles to Fig. 1. Fig. 3 is an enlarged view partly in central vertical section. Fig. 4 is a plan view of the actuating-disk.

All parts of my improvement are preferably made of suitable metal.

The hanger 1 has pendent arms 2, from whose free ends are supported suitable boxing 4 for the shaft 3 and is provided upon the lower face of its central portion with a pendent annular flange 5, having an annular groove of proper depth to form a bearing for the antifriction steel balls 6, which are also mounted in suitable sockets in the adjacent face of the friction-disk 7. By this construction the said disk is prevented from tilting by the lateral strain to which it is subjected, and the shaft 8, on which the disk is mounted, is relieved of all strain.

The friction-disk 7 consists of a cylindrical top or pulley portion adapted to receive a proper power-transmitting belt (not shown) and a hollow integral conical disk portion 9. The top of the said disk is provided with a spider, plate, or washer 10, whose radial arms have their free ends provided with openings 11, coincident with the said sockets in the adjacent face of the disk. The friction-disk 7 thus constructed is rigidly mounted on the said shaft 8 and preferably has a plate 12 inclosing the lower end of said shaft to prevent the dripping or leakage of oil upon the inner face of the disk, and thereby interfere with its frictional engagement, about to be described.

On the shaft 12 is rigidly fixed a proper cone-pulley 13, and also splined thereon are the conical disks 14 and 15, of different diameters, adapted to impart to the said pulley 13 different speeds of revolution as one or the other of the said disks 14 and 15 is shifted into an actuating frictional engagement with the driving-disk 9 by means of a common form of shifting device 16 and proper clutches 17 and 18.

The operation of my invention thus described is, briefly stated, as follows: Obviously the driving-belt can be shifted in any direction from the driving-disk without changing or shifting the hanger 1, as when the belt is extended in one direction it will be arranged within the arms 2 and when in a direction at right angles thereto it will inclose one of said arms without interfering therewith. It is thus seen that the counter-shaft can readily be placed at different angles to the line-shaft or in parallel relation therewith without changing the position of the driving-disk 7. When it is desired to change the direction of the rotation of the cone-pulley 13 when it is being driven in one direction by the frictional contact of the said driving-disk 7 with the disk 14, the operator simply shifts the said disks laterally, thus throwing the disk 14 out of such engagement and throwing the disk 15 into such engagement.

My improvement is thus cheap, simple, convenient, and efficient.

Having thus described my invention, what I desire to secure by Letters Patent is—

In a frictional driving mechanism, the hanger provided with pendent arms, and an annular flange 5 at its central portion, suitable boxes at the lower ends of said pendent arms, a pivotal rod which passes vertically through the hanger, a spider placed below the annular flange, and antifriction-balls placed in said spider and bearing against the annular flange and the top of the friction-disk, combined with the friction-disk upon the top of which the spider is placed and which disk is supported by the pivotal rod which passes through the top of the hanger, and is provided with a cylindrical top or pulley portion, and the conical disk portion at its lower edge, a horizontal shaft mounted in the boxes, suitable driving-pulleys secured to the shaft, conical disks splined upon the shaft and adapted to be brought alternately in contact with the disk portion of the friction-disk, and suitable shifting mechanism connected to said conical disks; the parts being combined and arranged to operate, substantially as shown and described.

Signed by me, at Bluffton, Wells county, State of Indiana, this 3d day of May, A. D. 1900.

ALBERT A. CARSON.

Witnesses:
SAM. M. KARNS,
LEVI A. LINN.